United States Patent [19]
Ito et al.

[11] Patent Number: 5,723,813
[45] Date of Patent: Mar. 3, 1998

[54] INSULATING SPACER WITH SHIELD ELECTRODES HAVING A GRADED RESISTANCE

[75] Inventors: Hiromi Ito; Kenji Mimura; Hirofumi Fujioka; Etsuro Tomonaga; Hiroshi Aoki; Hiroyuki Hama, all of Tokyo, Japan

[73] Assignee: Mitsubishi Denki Kabushiki Kaisha, Tokyo, Japan

[21] Appl. No.: 663,733

[22] Filed: Jun. 14, 1996

[30] Foreign Application Priority Data

Jun. 23, 1995 [JP] Japan ................................. 7-157723
Apr. 24, 1996 [JP] Japan ................................. 8-102743

[51] Int. Cl.⁶ ............................................ H01B 7/00
[52] U.S. Cl. ............... 174/28; 174/137 B; 174/140 R; 29/887
[58] Field of Search ............... 174/137 B, 138 C, 174/28, 29, 30, 31 R, 127, 140 R, 144; 29/887

[56] References Cited

U.S. PATENT DOCUMENTS

| | | | |
|---|---|---|---|
| 3,317,659 | 5/1967 | Frey | 174/140 R |
| 3,617,606 | 11/1971 | Dutton | 174/31 R |
| 3,673,305 | 6/1972 | Mashikian et al. | 174/12 BH |
| 3,801,725 | 4/1974 | Farish | 174/28 |
| 4,038,491 | 7/1977 | Gamble et al. | 174/153 R |
| 5,589,129 | 12/1996 | Kato et al. | 264/43 |

FOREIGN PATENT DOCUMENTS

| | | |
|---|---|---|
| 0148394A2 | 7/1985 | European Pat. Off. . |
| 0457081A1 | 11/1991 | European Pat. Off. . |
| 2319183 | 8/1995 | France . |
| 4007335A1 | 9/1991 | Germany . |
| 56-78315 | 6/1981 | Japan . |
| 57-28516 | 2/1982 | Japan . |
| 62-58820 | 3/1987 | Japan . |

*Primary Examiner*—Kristine L. Kincaid
*Assistant Examiner*—Kaman D. Cuneo
*Attorney, Agent, or Firm*—Burns, Doane, Swecker & Mathis, LLP

[57] ABSTRACT

The present invention provides an insulating spacer for a high-voltage conductor constructed with a plastic made of an epoxy resin composition so that the volumetric specific resistance of the shield electrode increases toward the median point between a container and the conductor and a method for manufacturing shield electrode used therein. The insulating spacer according to the present invention can lessen the concentration of electric fields in the boundary areas between the shield electrode and the insulating member with the result that reliability is improved and service life is lengthened.

20 Claims, 8 Drawing Sheets

VOLUMETRIC RATIO OF INORGANIC FILLER-FILLED
EPOXY RESIN COMPOSITION (VOL %)

FIG. 10
(PRIOR ART)

INSULATING SPACER WITH SHIELD ELECTRODES HAVING A GRADED RESISTANCE

BACKGROUND OF THE INVENTION

1. Field of the Invention

The present invention relates to an insulating spacer for use in gas insulation switches and other equipment.

2. Description of the Prior Art

Generally, gas insulation switches and compressed gas insulated transmission equipment use an insulating spacer designed to insulatingly support a high-voltage conductor in a grounded metallic container.

Figure 10:
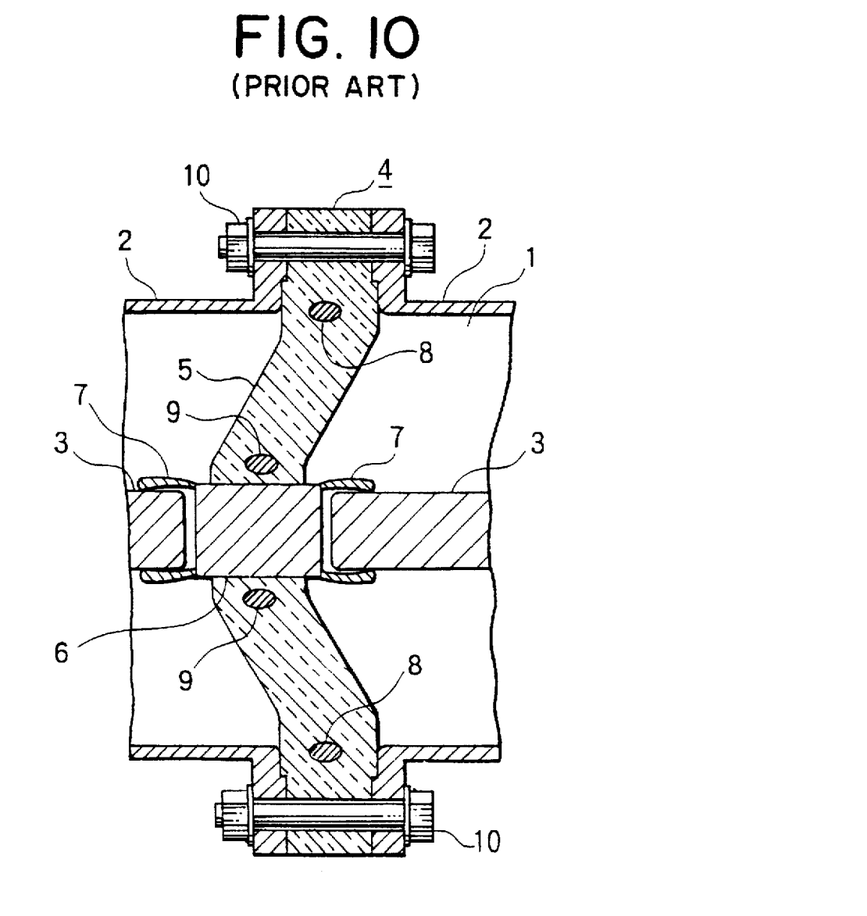
FIG. 10 is a vertical cross-sectional view showing a prior art insulating spacer.

For example, FIG. 10 shows a cross-sectional view illustrating a prior insulating spacer described in Japanese Patent Application Laid-open Nos. 62-58820 and 56-78315. In this drawing, a grounded container 2 packed with a high-pressure insulating gas 1 such as sulfur hexafluoride gas ($SF_6$) and insulating supports a high-voltage conductor 3 through an insulating spacer 4.

The insulating spacer 4 is constructed of an insulating member 5 made of epoxy resin etc., a connecting conductor 6 fixedly secured to the insulating member 5, and contacts 7 provided on each end portion of the conductor 6 and connected with the high-voltage conductor 3. Also included in the insulating spacer 4 is a shield electrode 8 made of aluminum or a conductive plastic, which is embedded in a portion of the insulating member 5 in the vicinity of the container 2 and electrically connected with the container 2. Further, included therein is a shield electrode 9 made of aluminum or a high conductive plastic, which is embedded in a portion of the insulating member 5 in the vicinity of the conductor 6 and electrically connected with the conductor 6. Designated at numeral 10 is fixing means comprising a bolt and nut for fixedly securing the insulating spacer 4 to the container 2.

The provisions of the shield electrodes 8 and 9, as above, can reduce non-uniform electric fields, with the result that the insulating characteristics of the insulating gas 1 can be kept from deteriorating.

However, with the thus constructed prior insulating spacer with the aluminum shield electrode, there has been a problem where the insulating member may crack due to stresses caused by differences in thermal expansion coefficients between the epoxy resin and the aluminum. Further, with the shield electrode of high conductive plastic, although the initial insulation characteristics are good, since a clear boundary between the insulating member and the shield electrode is formed, an electric field tends to concentrate in the boundary surfaces to cause insulation deterioration over long-term use. In addition, since a conductive filler is filled in at a high packing rate, the viscosity of the resin composition is increased and voids or the like tend to occur during injection patterning or casting, thus making it difficult to produce shield electrodes having stable characteristics.

SUMMARY OF THE INVENTION

It is therefore an object of the present invention to provide an insulating spacer which is capable of reducing the concentration of electric fields in boundary surfaces between an insulating member and a shield electrode.

Another object of the present invention is to provide a method of manufacturing a shield electrode for an insulating spacer capable of reducing the concentration of electric fields in boundary surfaces between the insulating member and the shield electrode.

A further object of the present invention is to provide an insulating spacer including an insulating member having improved crack resistance.

In accordance with one aspect of the present invention, there is provided an insulating spacer comprising a conductor placed in a grounded metallic container packed with an insulating gas and to which a high voltage is applied, an insulating member for fixedly securing the conductor to the container, and shield electrodes installed in the insulating member in the vicinity of the container and the conductor or in the vicinity of the container, wherein the shield electrodes are constructed with a plastic made with an epoxy resin composition so that the volumetric specific resistance of the shield increases toward the median point between the container and the conductor.

In accordance with another aspect of the present invention, there is provided a method of manufacturing shield electrodes for an insulating spacer comprising a conductor placed in a grounded metallic container packed with an insulating gas and to which a high voltage is applied, an insulating member for fixedly securing the conductor to the container, and the shield electrodes installed in the insulating member in the vicinity of the container and the conductor or in the vicinity of the container, wherein the shield electrodes are formed such that, an inorganic filler-filled epoxy resin composition A and a conductive epoxy resin composition B are injected or cast into a molding metal pattern and cured or hardened with a mixed volumetric ratio A/B of the inorganic filler-filled epoxy resin composition A to the conductive epoxy resin composition B varying to increase within a range of 0/100 to 80/20 toward the median point between the container and the conductor.

In accordance with a further aspect of the present invention, there is provided a method of manufacturing shield electrodes of an insulating spacer comprising a conductor placed in a grounded metallic container packed with an insulating gas and to which a high voltage is applied, an insulating member for fixedly securing the conductor to the container, and the shield electrodes installed in the insulating member in the vicinity of the container and the conductor or in the vicinity of the container, wherein the shield electrodes are formed such that, when injecting into a molding metal pattern and curing an epoxy resin composition containing an inorganic filler C and a conductive powder D with a low specific gravity below 2.5, the volumetric specific resistance thereof is varied to increase toward the median point between the container and the conductor by using a centrifugally separating force or a difference in settling velocity between the inorganic filler C and a low specific gravity conductive powder D at curing.

In accordance with a further aspect of the present invention, there is provided an insulating spacer comprising a conductor placed in a grounded metallic container packed with an insulating gas and to which a high voltage is applied, an insulating member for fixedly securing the conductor to the container, and shield electrodes installed in the insulating member in the vicinity of the container and the conductor or in the vicinity of the container, wherein the shield electrodes are constructed with a plastic made with a semi-conductive epoxy resin composition whose volumetric specific resistance is in a range of $10^4$ to $10^{10}$ $\Omega$cm. The shield electrodes of this insulating spacer have substantially uniform volumetric specific resistance.

In accordance with a further aspect of the present invention, there is provided an insulating spacer comprising a conductor placed in a grounded metallic container packed with an insulating gas and to which a high voltage is applied, an insulating member for fixedly securing the conductor to the container, and shield electrodes installed in the insulating member in the vicinity of the container and the conductor or in the vicinity of the container, wherein the insulating member is formed with an epoxy resin composition containing a brominated epoxy resin, an acid anhydride curing agent, a crosslinked-rubber powder, an inorganic filler and a hardening accelerator.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE PREFERRED EMBODIMENTS

A shield electrode of an insulating spacer according to the present invention is constructed with a plastic made of a conductive or semi-conductive epoxy resin composition so that its volumetric specific resistance varies continuously or stepwise within a range of from 10 to $10^{10}$ $\Omega$cm.

In a second embodiment, a shield electrode of an insulating spacer according to the present invention is formed with a plastic made of a conductive or semi-conductive epoxy resin composition so that its volumetric specific resistance shows a constant value within a range of from $10^0$ to $10^{10}$ $\Omega$cm.

Resin components of the conductive or semi-conductive epoxy resin composition may be different from or the same as the cast epoxy resin composition of the insulating material making up the insulating spacer. However, from the viewpoint of improving crack resistance of the insulating material, it is desirable that both cured compositions be approximately equal in thermal expansion coefficient.

As materials used to introduce conductivity into the composition, carbon powder, antimony oxide doped metallic oxide powder and metal-coated polymer powder may be used.

Examples of the carbon powder include acetylene black, furnace black and glassy carbon particles, which have a particle diameter in a range of from 0.01 to 200 µm. The loading or blending quantity thereof is from 5 to 70% by weight with respect to the whole composition.

Examples of the antimony oxide doped metallic oxide powder include zinc oxide powder, tin oxide powder, titanium oxide powder, and so on. At least one of these metallic oxide materials is added to the composition in an amount of from 10 to 500% by weight to the whole composition other than the metallic oxide powder.

Further, examples of the metal coated polymer powder include a phenol aldehyde resin powder whose surface is coated with a thin silver, nickel or similar membrane. The loading amount thereof is from 5 to 200% by weight to the whole composition other than the metal coated polymer powder.

The aforesaid material for introducing conductivity is used by mixing it with an epoxy resin, an acid anhydride curing agent resin, an inorganic filler and a hardening accelerator using any generally well-known agitator. In this case, to improve the agitation and mixture (dispersibility), it may be pre-mixed with the epoxy resin and the acid anhydride curing agent resin. The materials which demonstrate conduction may be used alone or in combination thereof.

In addition, electrodes comprising aluminum member(s) coated with a conductive epoxy resin composition may also be used as the shield electrodes of the insulating spacer according to the present invention.

EXAMPLES

Example 1

Figure 1:
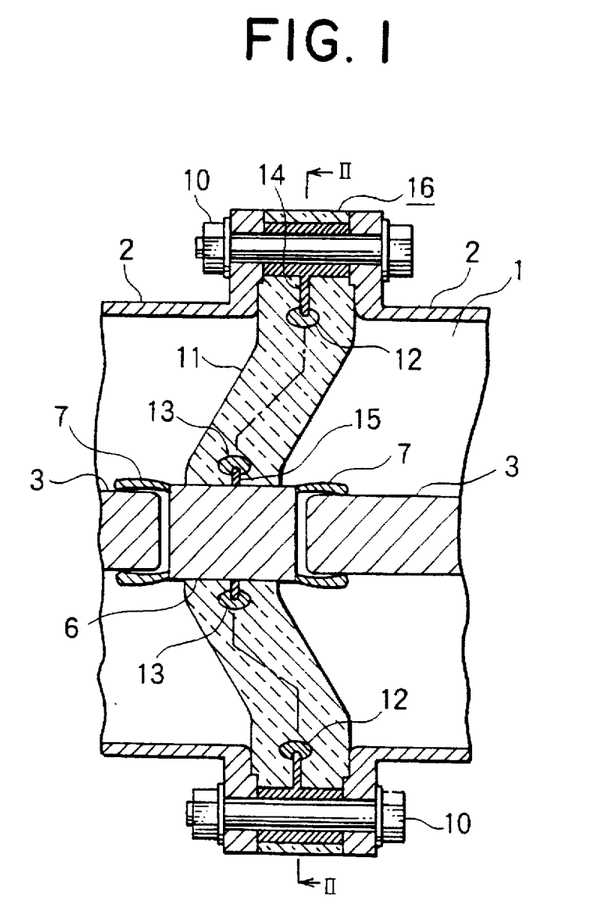
FIG. 1 is a vertical cross-sectional view showing an insulating spacer according to the present invention.
Figure 2:
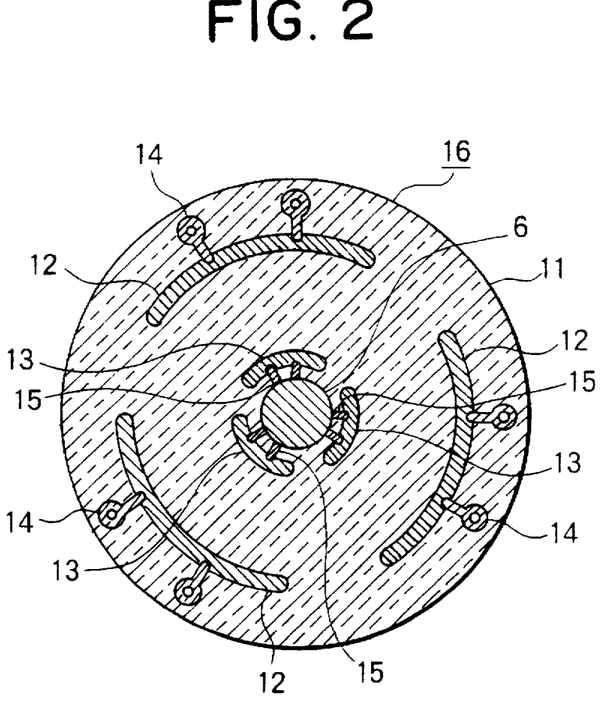
FIG. 2 is a horizontal cross-sectional view showing the insulating spacer according to the present invention, taken along a line II—II of FIG. 1.

FIG. 1 is a cross-sectional view showing an insulating spacer according to the embodiment of the present invention described in this Example 1, and FIG. 2 is a cross-sectional view taken along a line II—II of FIG. 1. In FIGS. 1 and 2, numerals 1 to 3, 6, 7 and 10 represent devices corresponding to those designated with the same numerals in FIG. 10. In addition, designated at numeral 11 is an insulating member fixedly secured to the conductor 6 and further fixedly secured to the container 2 by means of the fixing means 10, and denoted by numeral 12 are three divided shield electrodes embedded in the insulating member 11 in the vicinity of the container 2 to surround the conductor 6. The shield electrodes 12 are constructed with a plastic made of a conductive epoxy resin composition so that their volumetric specific resistance increases toward the median point between the container 2 and the conductor 6. Numeral 13 denotes three divided shield electrodes embedded in the insulating member 11 in the vicinity of the conductor 6 to surround the conductor 6. The shield electrodes 13 are constructed with a plastic made with a conductive epoxy resin so that their volumetric specific resistance increases toward the median point between the container 2 and the conductor 6. Further, numeral 14 indicates connection fittings embedded in the insulating member 11 for electrically connecting the shield electrodes 12 to the container 2 while numeral 15 signifies connection fittings for electrically connecting the shield electrodes 13 to the conductor 6.

An insulating spacer 16 is made up of the parts designated at numerals 6, 7 and 11 to 15. Although the shield electrodes 12 or 13 are divided into three in this description, there is no limitation on the number of divisions. Further, the shield electrodes 13 embedded in the insulating member 11 in the vicinity of the conductor 6 may be omitted if requirements permit.

The volumetric specific resistance can be varied continuously or stepwise within a range of from $10^0$ to $10^{10}$ $\Omega$cm including a semi-conductive range ($10^4$ to $10^{10}$ $\Omega$cm) in the shield electrodes 12 and 13 using a conductive epoxy resin composition in the following manner.

For example, this is achievable by injecting an inorganic filler-mixed epoxy resin composition A which is used to produce the insulating member 11 constituting the insulating spacer 16, and a conductive epoxy resin composition B into a molding metal pattern while changing their mixed volumetric ratio A/B stepwise or continuously within a range of from more than 0/100 to 80/20.

As described above, according to the embodiment of the present invention described in this Example 1, since the shield electrodes 12 and 13 are designed such that the volumetric specific resistance thereof increases toward the median point between the container 2 and the conductor 6, it is possible to reduce the concentration of electric fields in the boundary areas of each of the shield electrodes 12 and 13, and to reduce insulation deterioration so as to ensure long-term reliability.

Example 2

Figure 3:
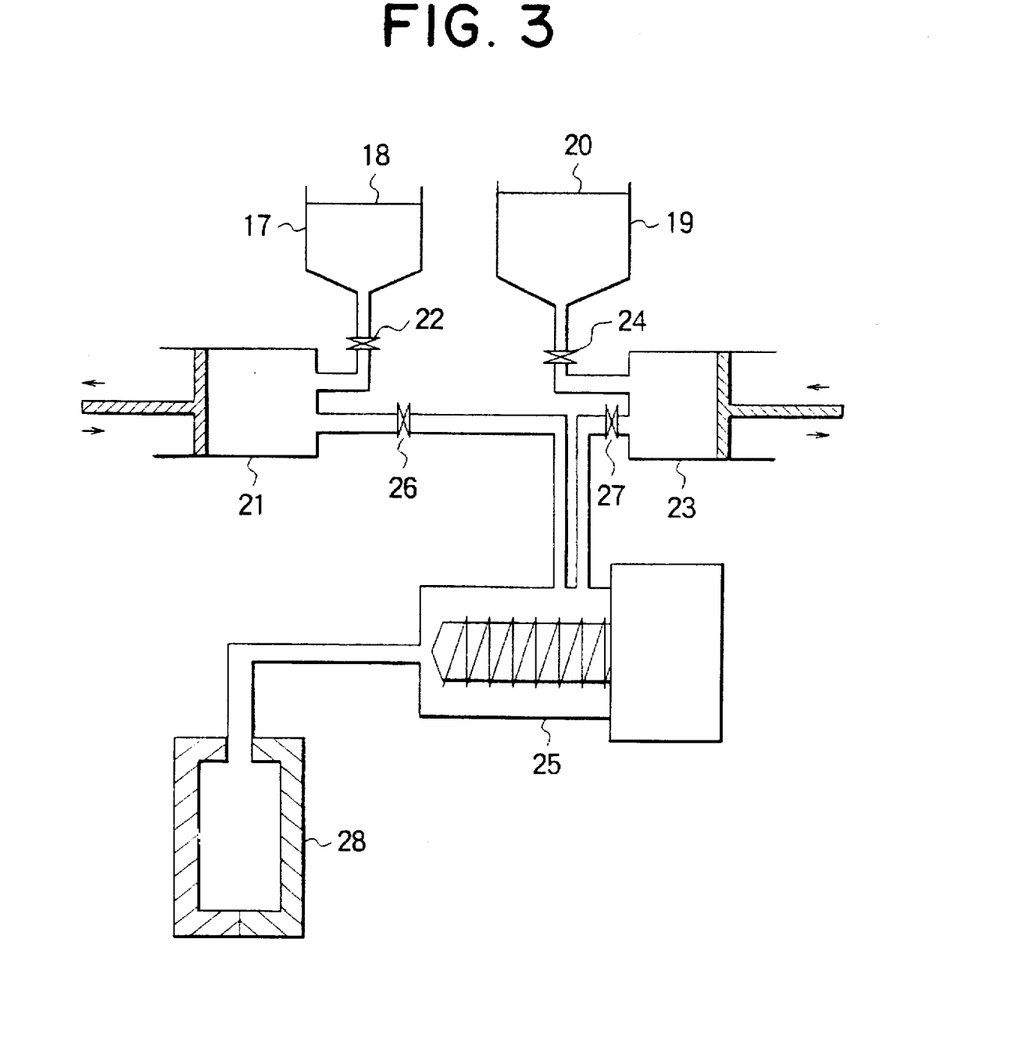
FIG. 3 is an illustrative view showing a structure of a forming apparatus used for the embodiment of the present invention described in Example 2.

FIG. 3 is an illustrative view of a construction of an apparatus for forming shield electrodes 12 and 13 according to the embodiment of the present invention described in this Example. In FIG. 3, numeral 17 denotes a tank for containing an inorganic filler-filled epoxy resin composition (A) 18 to be injected while 19 denotes a tank containing a conductive epoxy resin composition (B) 20. Also included in the forming apparatus are a cylinder 21 for drawing the inorganic filler-filled epoxy resin composition (A) 18 through a valve 22 from the tank 17 and a cylinder 23 for drawing the conductive epoxy resin composition (B) 20 through a valve 24 from the tank 19. A mixer 25 mixes the inorganic filler-filled epoxy resin composition (A) 18 coming through a valve 26 from the cylinder 21 and the conductive epoxy resin composition (B) 20 coming through a valve 27 from the cylinder 23. In addition, numeral 28 represents a metal pattern maintained at a temperature of from 100° C. to 200 20 C., where the epoxy resin compositions 18 and 20 mixed by the mixer 25 are injected and then cured.

With the above construction, the inorganic filler-filled epoxy resin composition (A) 18 and the conductive epoxy resin composition (B) 20 are injected into the metal pattern 28 with their mixed volumetric ratio A/B being varied stepwise or continuously from more than 0/100 to 80/20 by means of the adjustment of the opening and closure of the valves 22 and 24, with the result that the shield electrodes 12 and 13 with a specified configuration (see FIG. 2) can be produced.

Example 3

Figure 4:
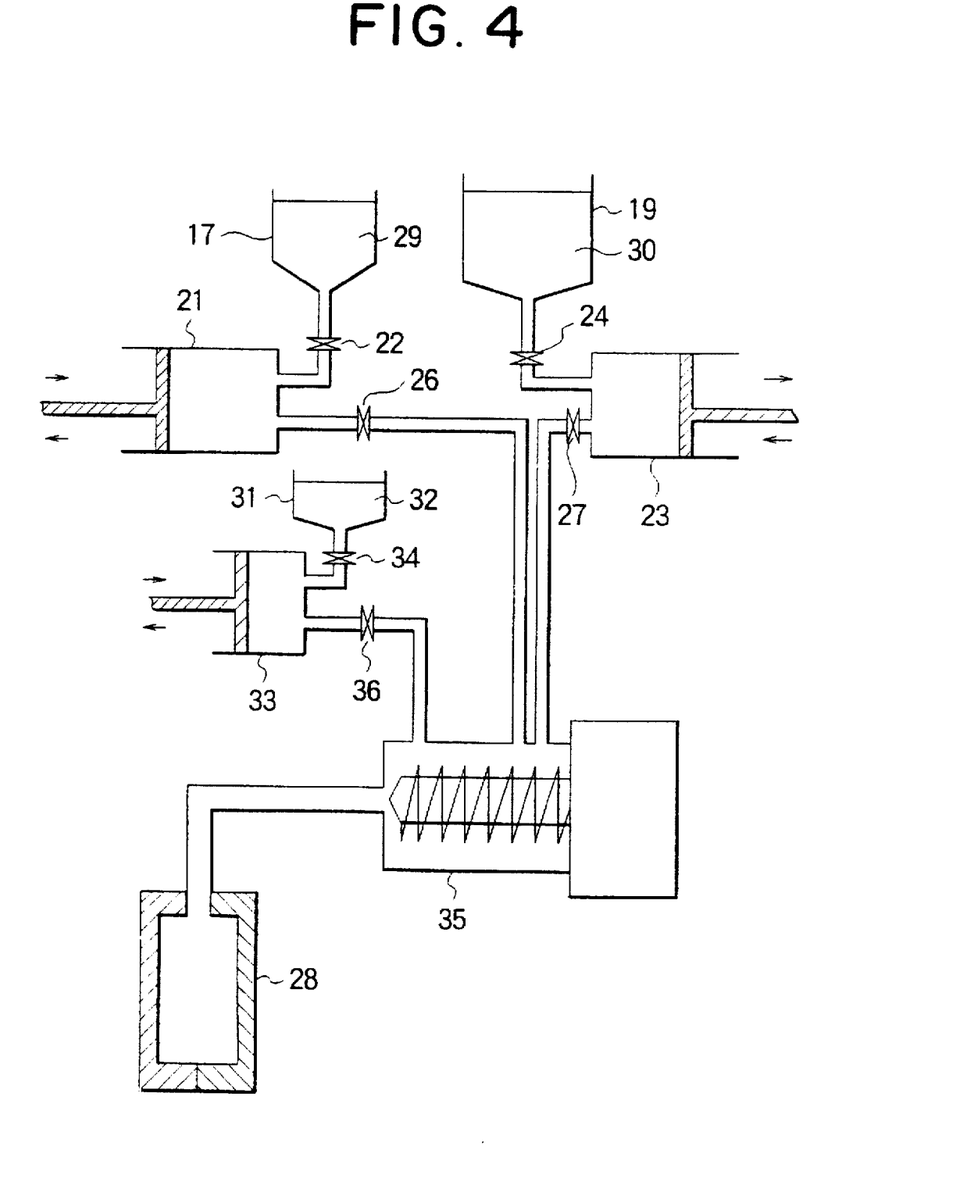
FIG. 4 is an illustrative view showing a structure of a forming apparatus used for the embodiment of the present invention described in Example 3.

FIG. 4 is an illustrative view of another construction of an apparatus for manufacturing shield electrodes 12 and 13 according to the embodiment of the present invention described in this Example. In FIG. 4, numerals 17, 19, 21 to 24 and 26 to 28 signify the parts corresponding to those designated with the same numerals in FIG. 3. Numeral 29 denotes a cast epoxy resin composition, where the hardening accelerator is excluded from the inorganic filler-filled epoxy resin composition, while designated at numeral 30 is an epoxy resin composition, i.e., the hardening accelerator being excluded from the conductive epoxy resin composition. Further, numeral 31 represents a tank for storing a hardening accelerator 32, and numeral 33 signifies a cylinder for drawing the hardening accelerator 32 through a valve 34 from the tank 31. A mixer 35 mixes the epoxy resin composition 29 supplied through a valve 26 from a cylinder 21 and the epoxy resin composition 30 fed through a valve 27 from a cylinder 23 while their mixed volumetric ratio is varied stepwise or continuously by the adjustment of the opening and closure of the valves 26, 27 and 36. Subsequently, at a given time the mixer 35 mixes the hardening accelerator 32, coming through the valve 36 from the cylinder 33, with both mixed epoxy resin compositions 29 and 30, and then injects the resultant mixture into the metal pattern 28 for curing.

In the above-described construction, since the hardening accelerator 32 is independently stored, the pot lives of the epoxy resin compositions stored in the tanks 17 and 19 may be extended.

Moreover, since the temperatures of the tanks 17 and 19 can be maintained at from 30° to 150° C., the viscosities of the epoxy resin compositions 29 and 30 can be lowered, thus improving workability.

Example 4

For manufacturing shield electrodes, at least one of a low specific gravity conductive material selected from a metal coated crosslinked polymer powder and a carbon powder with a specific gravity below 2.5 is injected into a metal pattern in an amount of from 5 to 70% by weight to the whole composition and further an epoxy resin composition mixed with from 10 to 80% by weight of an inorganic filler is injected thereinto. Since the resins show a low viscosity at a curing temperature, differences in settling velocity between a low specific gravity conductive material (for example, carbon powder, Bellpearl C-800 with a specific gravity of 1.6, produced by Kanebo Co., Ltd.) and an inorganic filler (for example, alumina with a specific gravity of 4) takes place due to the different specific gravities with the result that the concentration becomes non-uniform within the curing time period. Depending on the kind and loading amount of the hardening accelerator, the curing temperature is preferably from 100° C. to 200° C. Utilizing this phenomenon, the volumetric specific resistance within the shield electrodes can be varied stepwise or continuously.

Example 5

The epoxy resin composition being the mixture of the filler and the low specific gravity conductive material described in Example 4 may also be subjected to a centrifugal separating force at curing for manufacturing shield electrodes. As in Example 4 above, the curing temperature is preferably from 100° C. to 200° C. With this operation, the volumetric specific resistance within the shield electrodes can be varied stepwise or continuously. It is also possible to simultaneously utilize the settling velocity difference coming from the specific gravity difference described in Example 4.

Example 6

The use of brominated epoxy resins represented by formula (1) shown below, particularly an epoxy resin with a brominated bis A skeleton or a brominated bis F skeleton, as a cast epoxy resin composition can not only improve the glass transition temperature but also enhance the rupture or breaking strength.

In the above formula (1), each $R^1$ independently represents a hydrogen atom, a methyl group, a C2–C6 alkyl group, or an alkenyl group; x is an integer from 1 to 4, and n is an integer from 0 to 100.

For the cast epoxy resin composition, at least one kind of the brominated epoxy resins represented by the formula (1) which show a solid state at ordinary temperatures can be used as a mandatory component, and then added thereto may be epoxy resins which show a liquid state at ordinary temperatures, such as an epoxy resin with a bis A skeleton or a bis F skeleton, an alicyclic epoxy resin and an epoxy resin with a biphenyl skeleton. Further, it is possible to mix and use epoxy resins having various structures with the epoxy resins represented by the formula (1).

There is no limit to the acid anhydride and acid anhydrides with various structures are usable. In addition, the acid anhydride may be used alone or in combinations thereof.

The loading quantity of the acid anhydride to 100 parts by weight of epoxy is expressed as the formulae (2) to (4).

$$\text{(loading quantity: } phr) = \frac{(\text{acid anhydride equaivalent weight}) \times a \times 100}{(\text{epoxy equivalent weight})} \quad (2)$$

$$(\text{acid anhydride equivalent weight}) = \quad (3)$$

$$\frac{(\text{molecular weight of acid anhydride})}{(\text{number of acid anhydride groups})}$$

$$a = \frac{(\text{molar quantity of acid anhydride})}{(\text{epoxy equivalent weight})} \quad (4)$$

In the formula (4), it is desirable that the value a is in a range of from 0.5 to 1.0. If the value a is out of this range, there is a possibility of great heating weight reduction taking place and the glass transition temperature decreasing to impair performance.

Although when using a crosslinked rubber polymer powder with a functional group reactive to an epoxy resin adjustment according to the kind of functional group is required, the loading ratio in the reactive group between the principal epoxy group and the acid anhydride group must be in the aforesaid range.

Examples of the crosslinked rubber powder include a hydrogenated butadiene rubber, a hydrogenated polyisoprene rubber, an acrylic rubber, a butadiene-acrylic rubber, or others, in a fine powder form with a particle diameter of from 0.01 to 50 μm. This fine powder is dispersed uniformly in the epoxy resin, with the result that the fracture toughness is improved and stress can be alleviated, thus reforming its crack resistance, productivity, formation property and so on. For achieving uniform mixing in a cure material, the crosslinked rubber power can be preliminary mixed with an epoxy resin or an acid anhydride.

An appropriate loading quantity of the crosslinked rubber powder is from 5 to 30% by weight with respect to the total weight of the organic components. That is, a loading below 5% by weight fails to enhance the fracture toughness and makes it difficult to improve the crack resistance because the stress is barely alleviated, while a loading above 30% by weight increases the viscosity of the composition to deteriorate the workability.

Further, when an organic group (functional group) such as a carboxylic acid group, amino group and hydroxyl group reactive with an epoxy group exists on the particle surfaces of the crosslinked rubber powder, it reacts with an epoxy matrix during curing reaction to reinforce its interfaces, thereby enhancing its toughness.

Although the functional group present on the rubber particles comes into reaction during the curing reaction, it may also be preliminary reacted with the epoxy resin.

As the inorganic filler, an alumina filler or a silica filler may be used. The alumina filler can be used singly or can be used together with the silica filler. In this instance, limitation is not imposed on their mixing ratio. Moreover, its configuration can assume a spherical shape or a broken form.

Preferably, the average particle size of the inorganic fillers is below 60 μm, and in particular the average particle size is below 60 μm and more than 5% by weight of the fillers being particles having a size below 5 μm, and the content of the inorganic fillers is with in a range of from 10 to 80% by weight to the whole composition.

On the other hand, the silica filler used in the present invention is a natural silica or a synthetic silica.

Furthermore, as the hardening accelerator it is possible to use any kind of imidazole such as a 2-ethyl-4-methyl imidazole and their salts, phosphorus-based compounds represented by any kind of organic phosphine such as a liphenyl phosphine and a ring phosphine, aliphatic amines, aliphatic polyamines, aromatic amines, tertiary amines and their salts, dicyandiamides, any kind of Lewis acid Σ base catalyst, organic metallic salts such as salts of Bronsted acids, zinc octylate and tin octylate, polymercaptans, microcapsule catalysts, and so on, which can serve as a hardening accelerator to cure the ordinary epoxy resin.

These hardening accelerators may be used alone or in combination thereof. The quantity of the hardening accelerators to be used is from 0.05 to 10% by weight to 100% by weight of the epoxy resin.

The aforesaid epoxy resin compositions can be mixed with a common mixing apparatus. Further, in the case of producing an insulating spacer using the aforesaid epoxy resin compositions, a common forming apparatus, for example a pressure gelation forming apparatus or the like, can be used without any limitations.

Figure 5:
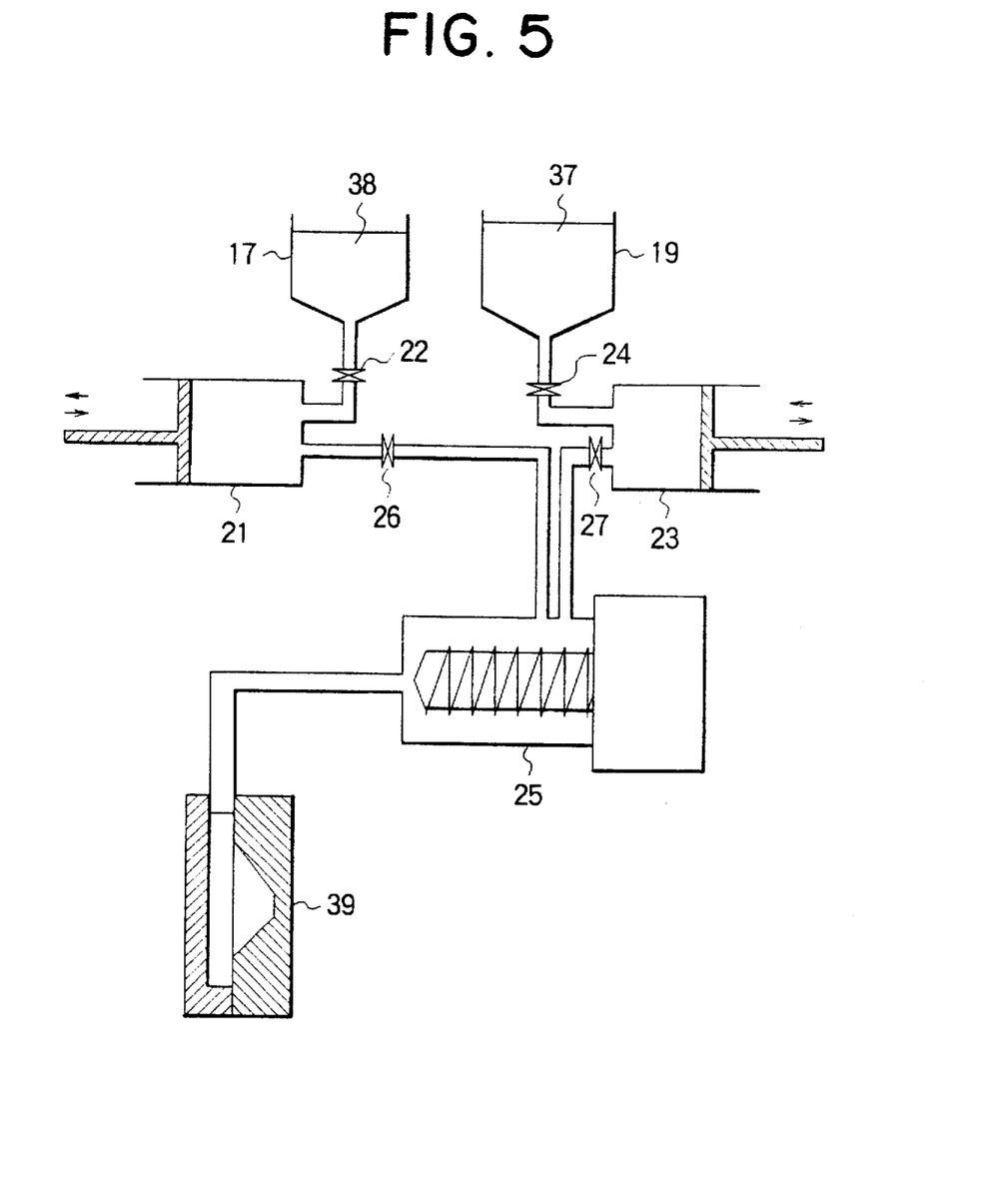
FIG. 5 is an illustrative view sowing a structure of a forming apparatus used for the embodiment of the present invention described in Example 6.

FIG. 5 is an illustrative view of a structure of one example of a forming apparatus. In FIG. 5, numerals 17, 19 and 21 to 26 represent the same parts as those described in Example 2. Further, numeral 37 denotes a cast epoxy resin composition reservoired in a tank 19, not including a curing accelerator, while designated at numeral 38 is a curing accelerator reservoired in a tank 17. Moreover, denoted at numeral 39 is a metal pattern for an insulating spacer which accommodates a shield electrode (not shown) formed in advance and disposed. In this construction, the epoxy resin composition 37 and the curing accelerator 38 separately reservoired are respectively fed through cylinders 21 and 23 into a mixer 25. This mixer 25 quantitatively mixes the epoxy resin composition 37 and the curing accelerator 38 and subsequently injects them under a pressure in a range of from 5 to 50 kg/cm$^2$ into the metal pattern 39 heated up to from 100° C. to 200° C., thereby achieving a high-speed formation. As mentioned above, the crack resistance of the insulating member (see FIG. 2) can be improved by blending the crosslinked rubber powder.

A detailed description will be made hereinbelow of the cast epoxy resin composition and the conductive epoxy resin composition according to embodiments of the present invention.

Example 7

With CT200 (WPE400, manufactured by Nagase Chiba Co., Ltd.) used as an epoxy resin, HN2200 (produced by Hitachi Kasei Kogyo Co., Ltd, neutralization equivalent: 83.0) as the acid anhydride, an alumina (A-42-6, produced by Showa Denko Co., Ltd., average particle diameter of 6.5 μm) as an inorganic filler and a zinc octylate as the curing accelerator, a mixture was made in a compounding or blending composition as shown in Table 1 to obtain a cast epoxy resin composition (a).

Example 8

In addition to the cast epoxy resin composition (a) of Example 7, carbon (produced by Kanebo Co., Ltd., Bellpearl C-800) was used as a conductive powder and mixed in the compounding composition shown in Table 1, thus attaining a conductive epoxy resin composition (b).

TABLE 1

| Ex. No. | Comp. | Epoxy resin CT200 | Acid anhydride HN2200 | Conductive powder | | | Inorganic filler A-42-6 | Hardening accelerator | Thermal expansion coefficient [ppm °C.$^{-1}$] | Glass transition temperature [°C.] | Volumetric resistance [Ω cm] |
|---|---|---|---|---|---|---|---|---|---|---|---|
| | | | | C-800 | T-1 | Bellpearl N | | | | | |
| 7 | a | 100 | 38 | 0 | 0 | 0 | 350 | 1 | 30 | 120 | $1.2 \times 10^{17}$ |
| 8 | b | 100 | 38 | 200 | 0 | 0 | 0 | 1 | 38 | 118 | $5.0 \times 10^{0}$ |
| 9 | c | 100 | 38 | 0 | 800 | 0 | 0 | 1 | 36 | 119 | $2.3 \times 10^{1}$ |
| 10 | d | 100 | 38 | 0 | 0 | 270 | 0 | 1 | 59 | 121 | $1.6 \times 10^{1}$ |
| 11 | e | 100 | 38 | 60 | 0 | 0 | 270 | 1 | 34 | 120 | $5.2 \times 10^{7}$ |

Example 9

With CT200 as the epoxy resin, HN2200 as the acid anhydride, a zinc octylate as the curing accelerator and an antimony oxide doped tin oxide $SnO_2$ (T-1, produced by Mitsubishi Material Co., Ltd.) as the conductive powder, a mixture was made in the compounding composition shown in Table 1, thereby producing a conductive epoxy resin composition (c).

Example 10

With CT200 as the epoxy resin, HN2200 as the acid anhydride, and a nickel-coated phenol resin (Bellpearl N, produced by Kanebo Co., Ltd.) as the conductive powder, a mixture was made in the blending composition shown in Table 1 to produce a conductive epoxy resin composition (d).

Example 11

With CT200 as the epoxy resin, HN2200 as the acid anhydride, an alumina (A-4-26) as the inorganic filler, C-800 as the conductive powder and a zinc octylate as the curing accelerator, a mixture was made in a compounding or blending composition as shown in Table 1 to obtain a semi-conductive epoxy resin composition (e).

Example 12

With a brominated epoxy resin (E-5051, WPE650, Yuka Shell Epoxy Co., Ltd.) with a structure represented by a formula (5) shown below as the epoxy resin, HN2200 as the acid anhydride, an acrylonitrile-butadiene rubber (XER-91, produced by Japan Synthetic Rubber Co., Ltd.), which has a carboxylic acid group on its surface, as the crosslinked rubber, A-42-6 as the inorganic filler and a zinc octylate as the curing accelerator, a mixture was made in a compounding composition as shown in Table 2, thus providing a cast epoxy resin composition (f).

(5)

TABLE 2

| Ex. No. | Comp. | Epoxy resin E-5051 | Epoxy resin FBEP-1 | Acid anhydride HN2200 | Crosslinked rubber XER-91 | Conductive powder C-800 | Inorganic filler A-42-6 | Inorganic filler RD-8 | Hardening accelerator | Thermal expansion coefficient [ppm °C.$^{-1}$] | Glass transition temperature [°C.] | Volumetric resistance [Ω cm] |
|---|---|---|---|---|---|---|---|---|---|---|---|---|
| 12 | f | 100 | 0 | 23 | 13 | 0 | 345 | 0 | 1 | 26 | 140 | $1.6 \times 10^{17}$ |
| 13 | g | 0 | 100 | 21 | 13 | 0 | 340 | 0 | 1 | 27 | 135 | $2.5 \times 10^{17}$ |
| 14 | h | 100 | 0 | 23 | 13 | 0 | 180 | 100 | 1 | 25 | 142 | $2.0 \times 10^{17}$ |
| 15 | i | 100 | 0 | 23 | 13 | 0 | 0 | 200 | 1 | 24 | 138 | $3.8 \times 10^{17}$ |
| 16 | j | 100 | 0 | 23 | 13 | 200 | 0 | 0 | 1 | 30 | 140 | $6.0 \times 10^{9}$ |
| 17 | k | 100 | 0 | 23 | 13 | 130 | 470 | 0 | 1 | 28 | 141 | $7.1 \times 10^{5}$ |

Example 13

In this example, a brominated epoxy resin (FBEP-13, WPE700, produced by Mitsui Toatsu Fine Co., Ltd.) which has a structure as represented by a formula (6) shown below was used as the epoxy resin and the other components were the same as those in Example 12. These components were mixed as shown in Table 2 to obtain a cast epoxy resin composition (g).

(6)

Example 14

In this Example, in place of the alumina filler (A-42-6) being the inorganic filler of the cast epoxy resin composition (f) in the above-mentioned Example 12, as shown in Table 2 the alumina filler (A-42-6) and a silica filler (RD-8, produced by Tatsumori Co., Ltd.) were blended and mixed therewith, thereby obtaining a cast epoxy resin (h).

Example 15

In this Example, in place of the alumina filler (A-42-6) being the inorganic filler of the cast epoxy resin composition (f) in the above-mentioned Example 12, as shown in Table 2 the silica filler (RD-8) was blended and mixed therewith, thereby obtaining a cast epoxy resin composition (i).

Example 16

In this Example, without using the alumina filler being the inorganic filler of the cast epoxy resin composition in the above-mentioned Example 12, as shown in Table 2 the conductive powder C-800 was blended and mixed to produce a conductive epoxy resin composition (j).

Example 17

The conductive powder C-800 was blended and mixed with the cast epoxy resin composition according to Example 12 as shown in Table 2, with the result that a semiconductive epoxy resin composition (k) was produced.

Example 18

Figure 6:
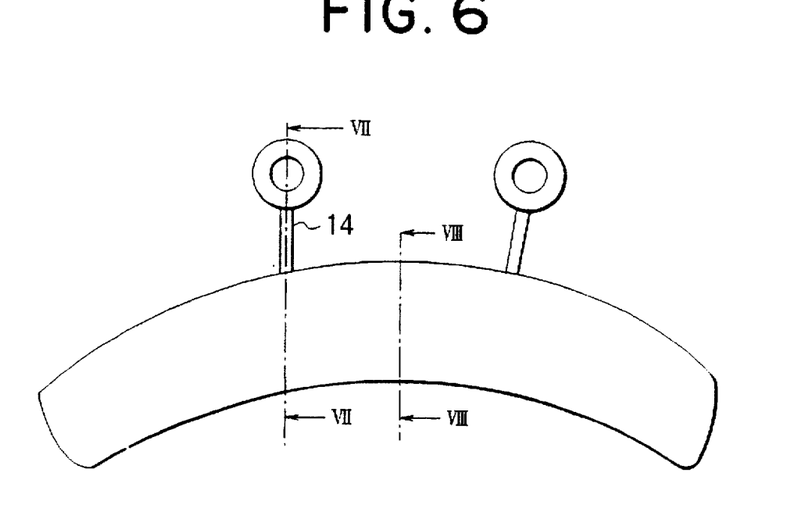
FIG. 6 is a front view showing a shield electrode manufactured according to the embodiment of the present invention described in Example 18.
Figure 7:
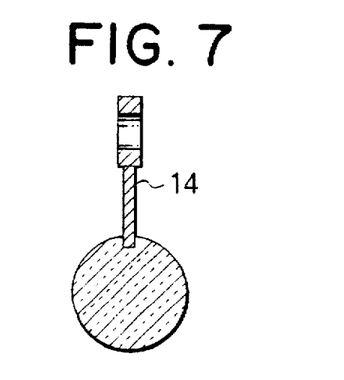
FIG. 7 is a cross-sectional view showing the shield electrode, taken along a line VII—VII of FIG. 6.

The cast epoxy resin composition (a) according to the aforesaid Example 7 was in the tank 18 of the forming apparatus shown in FIG. 3, while the conductive epoxy resin composition (b) according to Example 8 was stored in the tank 19, and both the resin compositions (a) and (b) were kept at a temperature of 100° C. The respective resin compositions (a) and (b) were supplied through the cylinders 21 and 23 into the mixer 25 with the mixture ratio (a/b) varying stepwise or continuously within a range of from more than 0/100 to 80/20. The mixer 25 mixed both the resin compositions (a) and (b) and subsequently injected them under a pressure of 30 kgf/mm$^2$ into the metal pattern 28 kept at a temperature of 160° C. After curing within the metal pattern 28 for 12 hours, a conductive shield electrode ([1] in Table 3) was obtained which had a configuration as shown in FIG. 6. FIG. 6 is a front elevational view showing the conductive shield electrode ([1] in Table 3), and FIG. 7 is a cross-sectional view taken along a line VII—VII of FIG. 6. In FIGS. 6 and 7, numeral 14 represents a connection fitting shown in FIG. 1.

TABLE 3

| Ex. No. | Comp. Ex. No. | Resin for shield electrode | Shield electrode | Resin for insulating spacer | Insulating spacer | Volumetric resistance of shield electrode [Ω cm] I | Volumetric resistance of shield electrode [Ω cm] II | Volumetric resistance of shield electrode [Ω cm] III | Thermal expansion coefficient of shield electrode [ppm °C.$^{-1}$] | Discharge start voltage of shield electrode [kVrms/mm] | Heat cycle test on insulating spacer |
|---|---|---|---|---|---|---|---|---|---|---|---|
| 18 | | a/b | [1] | a | A | $2.2 \times 10^{1}$ | $7.5 \times 10^{4}$ | $2.1 \times 10^{9}$ | 34 | 60 | O |
| 19 | | a/c | [2] | a | B | $3.2 \times 10^{2}$ | $4.4 \times 10^{5}$ | $9.8 \times 10^{9}$ | 34 | 55 | O |
| 20 | | a/d | [3] | a | C | $6.9 \times 10^{1}$ | $8.8 \times 10^{4}$ | $5.1 \times 10^{9}$ | 41 | 58 | O |
| 21 | | a/b | [4] | a | D | $6.5 \times 10^{3}$ | $5.7 \times 10^{6}$ | $3.8 \times 10^{8}$ | 36 | 56 | O |

TABLE 3-continued

| Ex. No. | Comp. Ex. No. | Resin for shield alectrode | Shield electrode | Resin for insulating spacer | Insulating spacer | Volumetric resistance of shield electrode [Ω cm] | | | Thermal expansion coefficient of shield electrode [ppm °C.$^{-1}$] | Discharge start voltage of shield electrode [kVrms/mm] | Heat cycle test on insulating spacer |
|---|---|---|---|---|---|---|---|---|---|---|---|
| | | | | | | I | II | III | | | |
| 22 | | e | [5] | a | E | $8.6 \times 10^6$ | $5.1 \times 10^7$ | $2.0 \times 10^7$ | 34 | 53 | O |
| 23 | | j/f | [6] | a | F | $1.8 \times 10^1$ | $6.2 \times 10^4$ | $4.8 \times 10^9$ | 29 | 58 | O |
| 24 | | k | [7] | a | G | $6.7 \times 10^5$ | $7.8 \times 10^7$ | $1.1 \times 10^7$ | 28 | 56 | O |
| | 1 | — | [8] | a | Y | — | — | — | 23 | 21 | X |
| | 2 | a/b | [9] | a | Z | $5.8 \times 10^8$ | $1.2 \times 10^5$ | $6.1 \times 10^2$ | 36 | 30 | O |

Figure 8:
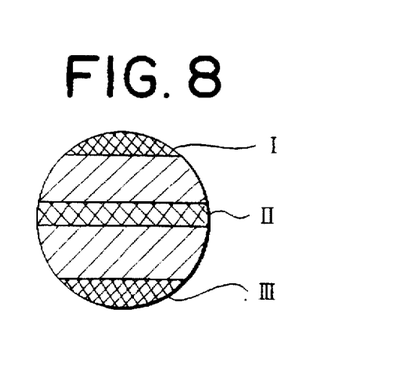
FIG. 8 is an illustrative view taken along a line VIII—VIII of FIG. 6, for explanation of areas I to III.

FIG. 8 is an illustrative view showing areas I, II and III in a cross section taken along a line VIII—VIII of FIG. 6.

Figure 9:
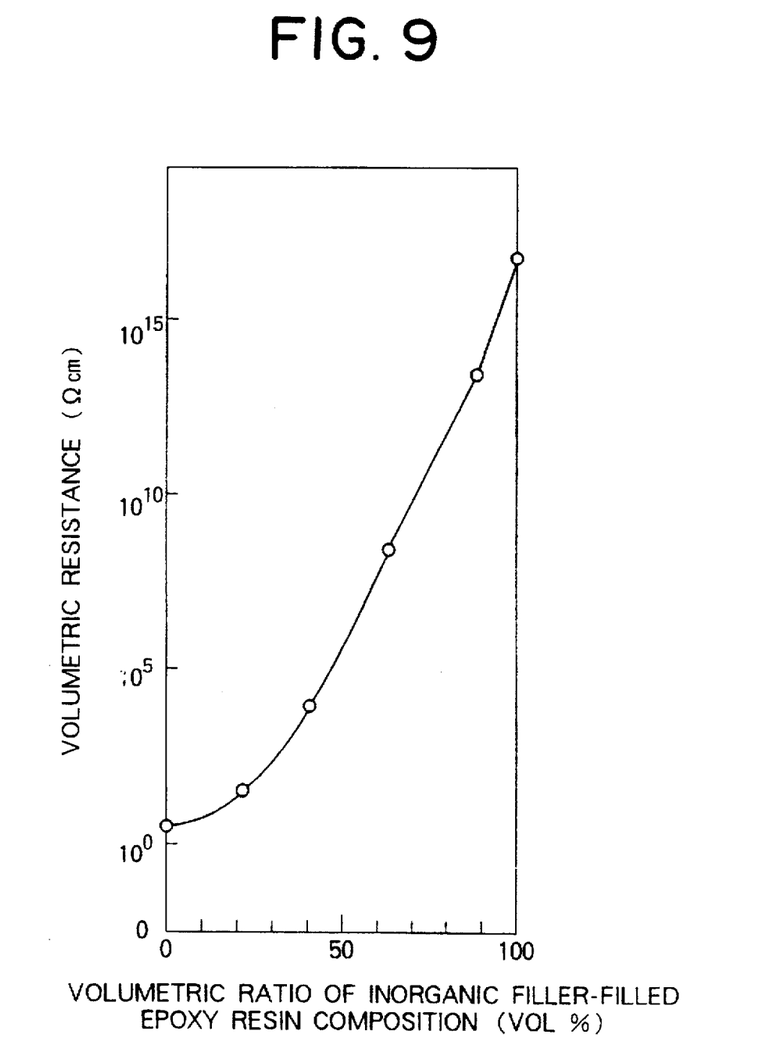
FIG. 9 is a graphic illustration for describing the relationship between a mixed ratio of an inorganic filler and a volumetric resistance of a shield electrode.

In FIG. 8, ash contents were measured through thermogravimetric analysis (TGA) on the cured materials in the respective areas I, II and III in order to confirm the mixture ratio of the inorganic filler. Further, the resistances in the respective areas I, II and III were obtained on the basis of the relationship between the mixture ratio of the inorganic filler (alumina filler) and the volumetric resistance experimentally given in advance as shown in FIG. 9. Table 3 shows the resultant volumetric resistances of shield electrodes.

Subsequently, the obtained shield electrode [1] was placed within the metal pattern at a temperature of 160° C. and cured with the cast epoxy resin composition (a) for 24 hours, thus producing an insulating spacer (A). Thereafter, ten cycles of a heat cycle test comprising a cycle of 100° C./one hour and 0° C./one hour were made to examine the presence or absence of crack occurrence, with the results being shown in Table 3. As shown in Table 3 the results of the measurements of the discharge start voltage of the shield electrode [1] of the insulating spacer (A) and the heat cycle test indicates that the discharge start voltage was sufficiently high and no cracks occurred.

Example 19

Using the cast epoxy resin composition (a) of Example 7 and the conductive epoxy resin composition (c) of Example 9, a conductive shield electrode [2] and an insulating spacer (B) as shown in Table 3 were manufactured in the same manner as described in Example 18.

When a test for the insulating spacer (B) was done in the same way in Example 18, the result was such that as shown in Table 3 the discharge start voltage of the shield electrode [2] was satisfactorily high and no cracking took place.

Example 20

Using the cast epoxy resin composition (a) of Example 7 and the conductive epoxy resin composition (d) of Example 10, a conductive shield electrode [3] and an insulating spacer (C) as shown in Table 3 were produced in the same manner as described in Example 18.

When a test of the insulating spacer (C) was made in the same way in Example 18, the result was such that as shown in Table 3 the discharge start voltage of the shield electrode [3] was satisfactorily high and no cracking took place.

Example 21

The cast epoxy resin composition (a) of Example 7 and the conductive epoxy resin composition (b) of Example 8 were mixed in such a way that their volumetric ratio a/b was 40/60 and then injected into the metal pattern heated to a temperature of 130° C., and cured for 24 hours in such a manner that the settling velocity varied due to the difference in specific gravity between the fillers, with the result that a conductive shield electrode [4] as shown in Table 3 was produced. Further, an insulating spacer (D) was obtained using the shield electrode [4] in the same manner as described in Example 18.

A test of the obtained insulating spacer (D) was made in the same way as in Example 18. As shown in Table 3 the results were such that the discharge start voltage of the shield electrode [4] was sufficiently high and no cracking occurred.

Example 22

The semi-conductive epoxy resin composition (e) of Example 11 was injected into the metal pattern having a temperature of 130° C., and then cured for 24 hours, thus producing a semi-conductive shield electrode [5].

Further, an insulating spacer (E) was obtained using the shield electrode [5] in the same manner as described in Example 18.

A test of the obtained insulating spacer (E) was taken in the same way as in Example 18. The results were such that as shown in Table 3 the discharge start voltage of the shield electrode [5] was sufficiently high and no cracking occurred.

Example 23

Using the conductive epoxy resin composition (j) of Example 16 and the cast epoxy resin composition (f) of Example 12, a conductive shield electrode [6] was produced in the same manner as described in Example 18.

Further, an insulating spacer (F), in which the shield electrode [6] was embedded, was obtained using the cast epoxy resin composition (a) in the same manner as described in Example 18.

When a test of the insulating spacer (F) was made in the same manner in Example 18, the result was such that as shown in Table 3 the discharge start voltage of the shield electrode [6] was satisfactorily high and no cracking took place.

Example 24

The semi-conductive epoxy resin composition (k) of Example 17 was used to produce a shield electrode [7]. Subsequently, the shield electrode [7] was placed within the metal pattern with a temperature of 160° C. and then cured with the cast epoxy resin composition (a) of Example 7 for 24 hours, thus obtaining an insulating spacer (G).

When a test of the insulating spacer (G) was made in the same manner in Example 18, the result was such that as shown in Table 3 the discharge start voltage of the shield electrode [7] was satisfactorily high and no cracking took place.

Comparative Example 1

An aluminum (Al)-made shield electrode [8] was placed within a metal pattern with a temperature of 160° C. and then cured with the cast epoxy resin composition (a) of Example 7 for 24 hours, thus obtaining an insulating spacer (Y).

When a test of the insulating spacer (Y) was made in the same manner in Example 18, the result was such that as shown in Table 3 the discharge start voltage of the shield electrode [7] was considerably lower as compared with those of Examples 18–24 and the heat cycle test indicated the occurrence of cracks.

Comparative Example 2

The cast epoxy resin composition (a) of Example 7 and the conductive epoxy resin composition (b) of Example 8 were fed into the mixer 25 (see FIG. 3) in such a way that the mixture ratio (a/b) was varied stepwise or continuously out of a range of from more than 0/100 to 80/20 (below 0/100 and above 80/20) in contrast to Example 18. Thereafter, a shield electrode [9] and an insulating spacer (Z) were obtained in the same manner as described in Example 18.

A test for the insulating spacer (Z) was made in the same way as in Example 18. In consequence, as shown in Table 3 the discharge start voltage of the shield electrode [9] was sufficiently high and no cracking occurred.

Example 25

The conductive shield electrode [1] of Example 18 was located within the metal pattern with a temperature of 160° C. and then cured with the cast epoxy resin composition (f) of Example 12 for 24 hours, thus creating an insulating spacer (H).

A test for the insulating spacer (H) was made in the same way as in Example 18. In consequence, as shown in Table 4 the discharge start voltage of the shield electrode [1] was sufficiently high and no cracking occurred.

Example 26

The conductive shield electrode [1] of Example 18 was located within the metal pattern with a temperature of 160° C. and then cured with the cast epoxy resin composition (g) of Example 13 for 24 hours, thus creating an insulating spacer (I).

A test for the insulating spacer (I) was made in the same way as in Example 18. In consequence, as shown in Table 4 the shield electrode [1] showed a sufficiently high discharge start voltage and no cracking occurred.

Example 27

The conductive shield electrode [1] of Example 18 was located within the metal pattern with a temperature of 160° C. and then cured with the cast epoxy resin composition (h) of Example 14 for 24 hours, thus obtaining an insulating spacer (J).

A test for the insulating spacer (J) was made in the same way as in Example 18. In consequence, as shown in Table 4 the shield electrode [1] indicated a sufficiently high discharge start voltage and no cracking occurred.

Example 28

The conductive shield electrode [1] of Example 18 was located within the metal pattern with a temperature of 160° C. and then cured with the cast epoxy resin composition (i) of Example 15 for 24 hours, thus obtaining an insulating spacer (K).

A test for the insulating spacer (K) was made in the same way as in Example 18. In consequence, as shown in Table 4 the shield electrode [1] showed a sufficiently high discharge start voltage and no cracking occurred.

Example 29

An aluminum (Al) shield electrode [10] was placed within a metal pattern with a temperature of 160° C. and then cured with the cast epoxy resin composition (f) of Example 12 for 24 hours, thus obtaining an insulating spacer (L).

A test for the insulating spacer (L) was made in the same way as in Example 18. In consequence, as shown in Table 4 the shield electrode [10] indicated a sufficiently high discharge start-voltage and no cracking occurred.

Example 30

An aluminum (Al) shield electrode [10] was placed within a metal pattern with a temperature of 160° C. and then cured with the cast epoxy resin composition (g) of Example 13 for 24 hours, thus obtaining an insulating spacer (M).

TABLE 4

| Ex. No. | Comp. Ex. | Resin for shield electrode | Shield electrode | Resin for insulating spacer | Insulating spacer | Discharge start voltage of shield electrode [kVrms/mm] | Heat cycle test on insulating spacer |
|---|---|---|---|---|---|---|---|
| 25 | | a/b | [1] | f | H | 65 | O |
| 26 | | a/b | [1] | g | I | 62 | O |
| 27 | | a/b | [1] | h | J | 57 | O |
| 28 | | a/b | [1] | i | K | 56 | O |
| 29 | | — | [10] | f | L | 45 | O |
| 30 | | — | [10] | g | M | 48 | O |
| 31 | | — | [10] | h | N | 45 | O |
| 32 | | — | [10] | i | P | 43 | O |
| 33 | | j/Al | [11] | a | Q | 57 | O |
| 34 | | j/f | [6] | f | R | 67 | O |
| | 3 | — | [10] | a | Y | 21 | X |

A test for the insulating spacer (M) was made in the same way as in Example 18. In consequence, as shown in Table 4 the discharge start voltage of the shield electrode [10] was sufficiently high and no cracking occurred.

Example 31

An aluminum (Al) shield electrode [10] was placed within a metal pattern with a temperature of 160° C. and then cured with the cast epoxy resin composition (h) of Example 14 for 24 hours, thus obtaining an insulating spacer (N).

A test for the insulating spacer (N) was made in the same way as in Example 18. In consequence, as shown in Table 4 the discharge start voltage of the shield electrode [10] was sufficiently high and no cracking occurred.

Example 32

An aluminum (Al) shield electrode [10] was placed within a metal pattern with a temperature of 160° C. and then cured with the cast epoxy resin composition (i) of Example 15 for 24 hours, thus obtaining an insulating spacer (P).

A test for the insulating spacer (P) was made in the same way as in Example 18. In consequence, as shown in Table 4 the discharge start voltage of the shield electrode [10] was sufficiently high and no cracking occurred.

Example 33

An aluminum (Al) metallic member was coated with the conductive epoxy resin composition (j) of Example 16 to obtain a shield electrode (11). Further, the shield electrode [11] was placed within a metal pattern with a temperature of 160° C. and then cured with the cast epoxy resin composition (a) of Example 7 for 24 hours, thereby producing an insulating spacer (Q).

A test for the insulating spacer (Q) was made in the same way as in Example 18. In consequence, as shown in Table 4 the discharge start voltage of the shield electrode [11] was sufficiently high and no cracking occurred.

Example 34

The conductive shield electrode [6] of Example 23 was placed within a metal pattern with a temperature of 160° C. and then cured with the cast epoxy resin composition (f) of Example 12 for 24 hours, thus obtaining an insulating spacer (R).

A test for the insulating spacer (R) was made in the same way as in Example 18. In consequence, as shown in Table 4 the shield electrode [10] indicated a sufficiently high discharge start voltage and no cracking occurred.

Comparative Example 3

An aluminum (Al)-made shield electrode [10] was placed within a metal pattern with a temperature of 160° C. and then cured with the cast epoxy resin composition (a) of Example 7 for 24 hours, thus obtaining an insulating spacer (Y).

A test of the insulating spacer (Y) was made in the same way as in Example 18. Consequently, as shown in Table 4 the discharge start voltage of the shield electrode [10] was less tahn ½ of those of Examples 25–34 and the result of the heat cycle test showed the occurrence of cracks.

Example 35

An aluminum (Al) shield electrode [10] was placed within the metal pattern 28 with a temperature of 160° C. and further a conductive shield electrode [12] was obtained using the cast epoxy resins (a) and (b) used in Example 18 in the same forming manner as described in Example 18. Subsequently, the shield electrode [12] was cured with the cast epoxy resin (a) for 24 hours to obtain an insulating spacer (S).

A test for the insulating spacer (S) was made in the same way as in Example 18. In consequence, as shown in Table 5 the discharge start voltage of the shield electrode [12] was sufficiently high and no cracking occurred.

TABLE 5

| Ex. No. | Resin for shield electrode | Shield electrode | Resin for insulating spacer | Insulating spacer | Volumetric resistance of shield electrode [Ω cm] | | | Thermal expansion coefficient of shield electrode [ppm °C.$^{-1}$] | Discharge start voltage of shield electrode [kVrms/mm] | Heat cycle test on insulating spacer |
|---|---|---|---|---|---|---|---|---|---|---|
| | | | | | I | II | III | | | |
| 35 | a/b/Al | [12] | a | S | $5.3 \times 10^4$ | $3.1 \times 10^8$ | $1.3 \times 10^8$ | — | 57 | O |
| 36 | e | [13] | a | T | $5.2 \times 10^7$ | $5.2 \times 10^7$ | $5.2 \times 10^7$ | 56 | 56 | O |
| 37 | e/Al | [14] | a | U | $5.2 \times 10^7$ | $5.2 \times 10^7$ | $5.2 \times 10^7$ | — | 55 | O |

Example 36

A resin composition (e') which had the same composition as the semi-conductive epoxy resin (e) of Example 11 except that the amount of the curing accelerator was increased up to three parts by weight was used and injected into a metal pattern with a temperature of 160° C. and then cured for 24 hours, thus producing a semi-conductive shield electrode [13]. Subsequently, the cast epoxy resin composition (a) of Example 7 was used and, after curing for 24 hours, an insulating spacer (T) was obtained.

A test for the insulating spacer (T) was made in the same way as in Example 18. In consequence, as shown in Table 5 the shield electrode [13] showed a sufficiently high discharge start voltage and no cracking occurred.

Example 37

An aluminum (Al) shield electrode [10] was placed within the metal pattern 28 with a temperature of 160° C. and then cured with the cast epoxy resin (e') of Example 36 for 24 hours so that a semi-conductive shield electrode [14] was obtained. Subsequently, it was cured with the cast epoxy resin composition (a) of Example 7 for 24 hours, thereby producing an insulating spacer (U).

A test for the insulating spacer (U) was made in the same way as in Example 18. In consequence, as shown in Table 5 the shield electrode [14] showed a sufficiently high discharge start voltage and no cracking occurred.

EFFECTS OF THE INVENTION

As obvious from the above-described Examples, the insulating spacers according to the present invention are constructed with a plastic made of an epoxy resin composition so that the volumetric specific resistance of the shield electrode increases toward the median point between the container and the conductor, and hence the concentration of electric fields in the boundary areas between the shield electrode and the insulating member is reducible with the result that reliability is improved, service life is lengthened and it is extremely useful in industrial fields.

Moreover, the shield electrode manufacturing method according to the present invention can reduce the electric field concentration and hence produce a shield electrode which has high reliability and long service life and is extremely useful in industrial fields.

Furthermore, in another insulating spacer according to the present invention, the insulating member is formed with a brominated epoxy resin composition comprising an epoxy resin, an acid anhydride curing agent, a crosslinked-rubber powder, an inorganic filler and a hardening accelerator. Accordingly, with the help of the contained crosslinked rubber powder, the glass transition temperature is increased and the thermal expansion coefficient is reduced, with the result that the crack resistance of the resultant insulating spacer improves to enhance its reliability and lengthen its service life so that its industrial value becomes extremely high.

It should be understood that the foregoing relates only to preferred embodiments of the present invention, and that it is intended to cover all changes and modifications of the embodiments of the invention herein used for the purposes of the disclosure, which do not constitute departures from the spirit and scope of the invention.

What is claimed is:

1. An insulating spacer comprising a conductor placed in a grounded metallic container packed with an insulating gas and to which a high voltage is applied, an insulating member for fixedly securing said conductor to said container, and shield electrodes installed in said insulating member in the vicinity of said container and said conductor or in the vicinity of said container, said shield electrodes being constructed with a plastic made of an epoxy resin composition such that their volumetric specific resistivity increases toward the median point between said container and said conductor.

2. An insulating spacer as defined in claim 1, wherein the increase in volumetric resistivity of said shield electrodes is from $10^0$ to $10^{10}$ $\Omega$cm.

3. An insulating spacer as defined in claim 1, wherein the increase in volumetric resistivity of said shield electrodes is from $10^4$ to $10^{10}$ $\Omega$cm.

4. An insulating spacer as defined in claim 1, wherein said shield electrodes are constructed by coating a metallic member with said plastic.

5. An insulating spacer as defined in claim 1, wherein said plastic is made with said epoxy resin composition comprising a mixture of an inorganic filler-filled epoxy resin composition A and a conductive epoxy resin composition B.

6. An insulating spacer as defined in claim 5, wherein a mixed volumetric ratio A/B of said inorganic filler-filled epoxy resin composition A to said conductive epoxy resin composition B increases from 0/100 to 80/20 toward the median point between said container and said conductor.

7. An insulating spacer as defined in claim 5, wherein said conductive epoxy resin composition B contains at least one of a carbon powder, a metallic oxide powder and a metal-coated crosslinked polymer powder.

8. An insulating spacer as defined in claim 1, wherein said plastic is made with a conductive epoxy resin composition containing an inorganic filler C and a conductive powder D with a low specific gravity below 2.5.

9. An insulating spacer as defined in claim 8, wherein with respect to the whole composition, the content of said inorganic filler C is from 10 to 80% by weight and the content of said low specific gravity conductive powder D is from 70 to 5% by weight.

10. An insulating spacer as defined in claim 8, wherein said low specific gravity conductive powder D comprises at least one of a carbon powder and a metal-coated crosslinked polymer powder.

11. A method of manufacturing shield electrodes of an insulating spacer comprising a conductor placed in a grounded metallic container packed with an insulating gas and to which a high voltage is applied, an insulating member for fixedly securing said conductor to said container, and shield electrodes installed in said insulating member in the vicinity of said container and said conductor or in the vicinity of said container, wherein said shield electrodes are formed such that, an inorganic filler-filled epoxy resin composition A and a conductive epoxy resin composition B are injected into a molding metal pattern, with a mixed volumetric ratio A/B of said inorganic filler-filled epoxy resin composition A and said conductive epoxy resin composition B varying to increase within a range of 0/100 to 80/20 toward the median point between said container and said conductor, and cured.

12. A method of manufacturing shield electrodes of an insulating spacer comprising a conductor placed in a grounded metallic container packed with an insulating gas and to which a high voltage is applied, an insulating member for fixedly securing said conductor to said container, and shield electrodes installed in said insulating member in the vicinity of said container and said conductor or in the vicinity of said container, wherein said shield electrodes are formed such that, in injecting into a molding metal pattern and curing an epoxy resin composition containing an inorganic filler C and a conductive powder D with a low specific gravity below 2.5, volumetric specific resistivity of said shield electrodes is made to vary to increase toward the median point between said container and said conductor using at least one of a centrifugal separating force and a difference in settling velocity between said inorganic filler C and said low specific gravity conductive powder D at curing.

13. An insulating spacer comprising a conductor placed in a grounded metallic container packed with an insulating gas and to which a high voltage is applied, an insulating member for fixedly securing said conductor to said container, and shield electrodes installed in said insulating member in the vicinity of said container and said conductor or in the vicinity of the container, said shield electrodes being constructed with a plastic made with a semi-conductive epoxy resin composition whose volumetric resistivity is in a range of from $10^4$ to $10^{10}$ $\Omega$cm, and said shield electrodes being constructed so that the volumetric resistivity of said shield electrodes increases toward the median point between said container and said conductor.

14. An insulating spacer as defined in claim 13, wherein said shield electrodes are formed by coating a metallic member with said plastic.

15. An insulating spacer comprising a conductor placed in a grounded metallic container packed with an insulating gas and to which a high voltage is applied, an insulating member for fixedly securing said conductor to said container, and shield electrodes installed in said insulating member in the vicinity of said container and said conductor or in the vicinity of said container, said insulating member being formed with an epoxy resin composition containing a brominated epoxy resin, an acid anhydride curing agent, a crosslinked-rubber powder, an inorganic filler and a hardening accelerator, said shield electrodes being constructed so that their volumetric specific resistivity increases toward the median point between said container and said conductor.

16. An insulating spacer as defined in claim 15, wherein said epoxy resin composition further contains said brominated epoxy resin which is in a liquid state at room temperature.

17. An insulating spacer as defined in claim 15, wherein said crosslinked rubber powder is made with a crosslinked acrylic-based rubber and is added in an amount of from 5 to 30% by weight, compared to the total weight of said composition.

18. An insulating spacer as defined in claim 17, wherein said crosslinked rubber powder has on its surfaces an organic group reactive with an epoxy group.

19. An insulating spacer as defined in claim 15, wherein said inorganic filler comprises alumina particles whose average particle diameter is not more than 60 µm, and of said alumina particles the particles no more than 5 µm in average diameter contributing no less than 5% by weight, compared to the total weight of said composition, said 60 µm alumina particles being blended within a range of from 10 to 80% by weight with respect to the whole composition.

20. An insulating spacer as defined in claim 15, wherein said inorganic filler is a mixture of alumina particles and silica particles, the average particle diameter of said particles being not more than 60 µm, and the particles no more than 5 µm in average diameter contributing not less than 5% by weight, compared to the total weight of said composition, and in said mixture the blending rate of said 60 µm alumina particles being above 0% by weight but below 100% by weight.

* * * * *